United States Patent Office 3,538,670
Patented Nov. 10, 1970

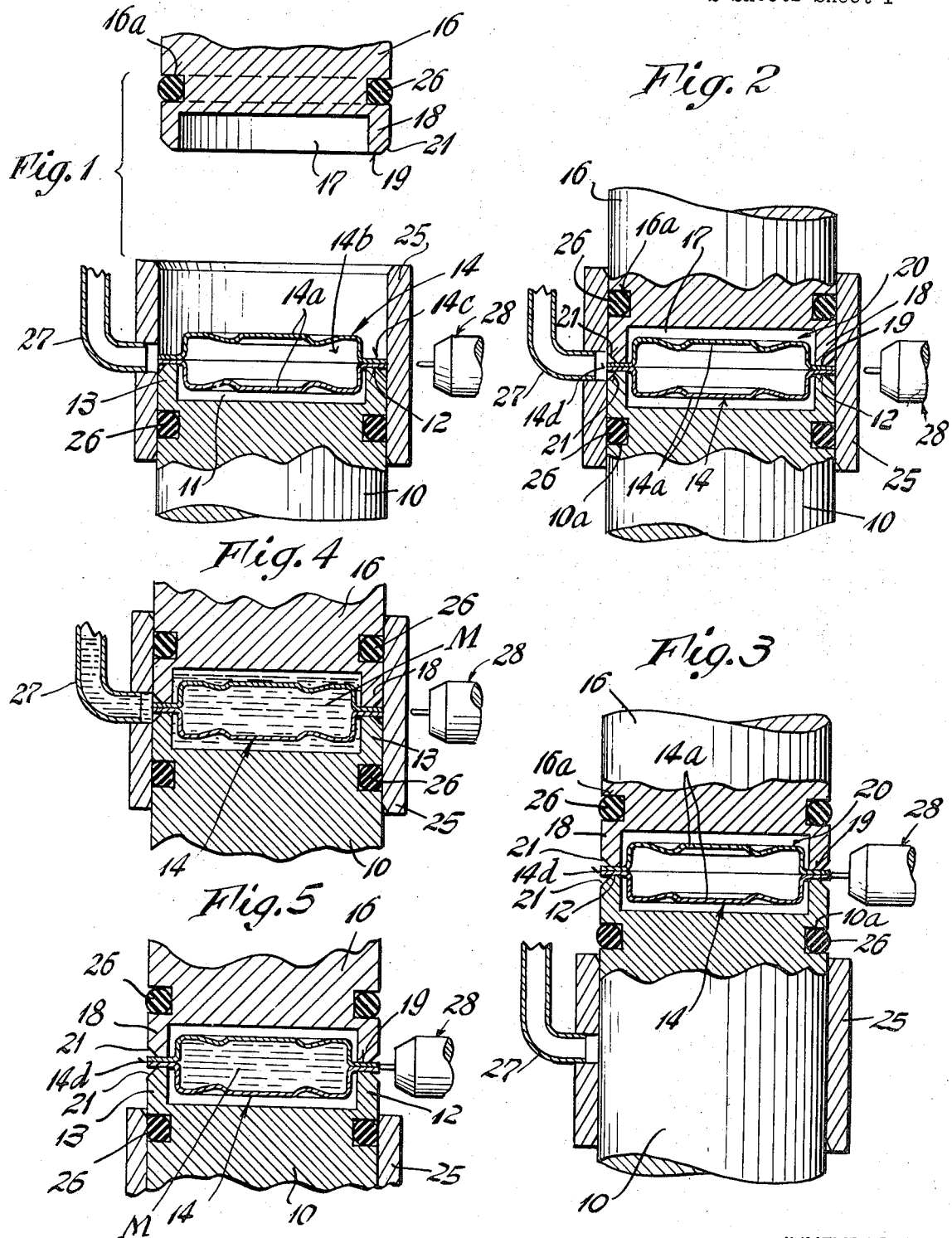

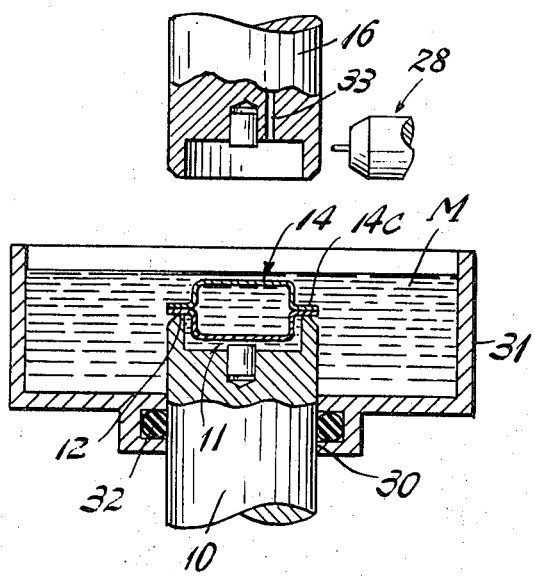
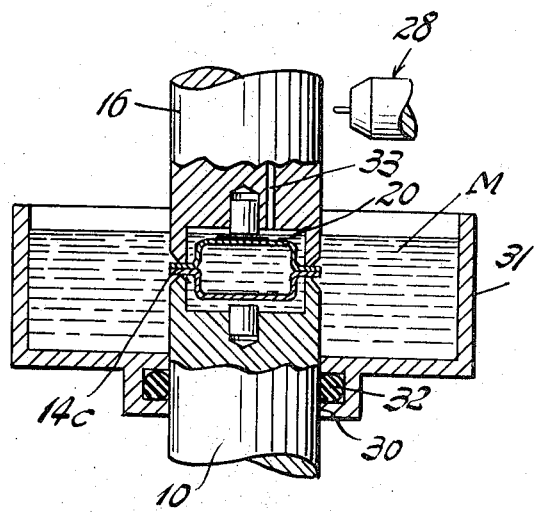
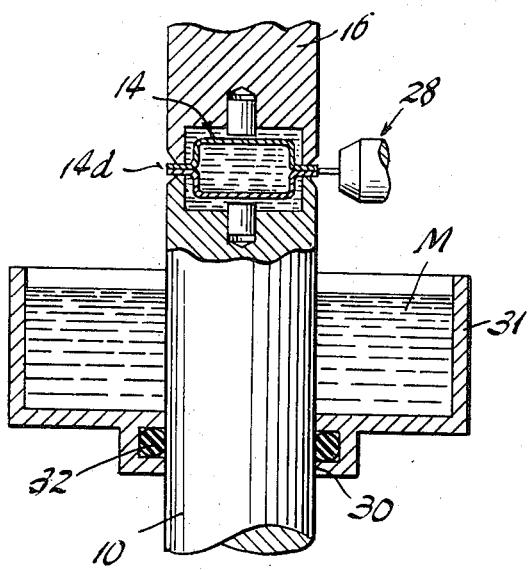

3,538,670
METHOD AND APPARATUS FOR FORMING SEALED ARTICLES
David Luke Morgan, Shelton, Conn., assignor to Seymour-Sheridan, Inc., Stratford, Conn., a corporation of Connecticut
Filed July 10, 1968, Ser. No. 743,732
Int. Cl. B65b 31/04
U.S. Cl. 53—22                                6 Claims

ABSTRACT OF THE DISCLOSURE

The method and apparatus for forming plural-part hollow articles which may be evacuated or filled and thereafter sealed. This is done by positioning the article having projecting flanges in a recess disposed between the ends of opposed arbors or die members with the flanges engaged by the ends of the wall around said recess, evacuating and/or filling the article with a desired material, pressing the flanges together by the arbors with the edges of the flanges exposed, and securing the edges together.

---

The present invention provides an effective apparatus and method for producing evacuated or filled articles in a simple, efficient and effective manner.

In carrying out the invention, the article is disposed in a cavity formed by recesses in the arbors or die members with the flanges on the article engaged by surfaces of the end of the arbor surrounding said recesses. The edges of the flanges are exposed preferably by cutting away or chamfering the ends of the arbor surrounding said flange-engaging surface. After the article has been treated as by evacuation or filling, the free edges of the projecting flanges are secured together to complete the article.

In one form of the invention a sliding sleeve sealingly engages and encloses the ends of the arbors during the treating of the article and is moved to expose the edges of the flanges to enable them to be secured together.

In another form of the invention the end of one arbor and the article carried thereby are submerged in a tank having material for filling the article. The other arbor is moved into engagement with the flanges to press them together to seal the filled article and the two arbors are simultaneously moved to remove the exposed edges of the flanges from the tank to a position in which they can be secured together.

Other features and advantages of the invention will be apparent from the specification and claims when considered in connection with the accompanying drawings in which:

FIGS. 1 through 5 show the sequence of steps of producing sealed articles according to one form of the invention.

FIGS. 6 through 8 show the sequence of steps of forming the sealed articles by another form of the invention.

In the form of the invention shown in FIGS. 1 through 5, a first arbor or die 10 is provided with a recess 11 in its end. The end surface 12 of the wall 13 surrounding the recess forms a flange-engaging surface which is adapted to support the projecting flanges 14c of an article 14 positioned in the recess. The article can be of any suitable material capable of forming a hermetically sealed container, capsule or bellows assembly and may be evacuated or fluid filled with any material which it is desired to package within the article. As herein illustrated, the article comprises a plurality of metal parts 14a shaped to provide a cavity 14b between them and each having laterally projecting cooperating flanges 14c which extend over the surface 12.

A second arbor 16 may have a recess 17 in its end face, if necessary, to receive the article and a wall 18 surrounding the recess. The end of the arbor is provided with a flange-engaging end surface 19 which is moved by any suitable means, such as a fluid cylinder means as shown in U.S. Pat. No. 3,020,686, into engagement with the flanges 14c, as shown in FIG. 2, to enclose the article within a cavity 20 formed by the recesses. Preferably, the edges 14d of the flanges do not project beyond the sides of the arbors and the end surfaces of the two arbors are cut away or chamfered at their outer edges, as shown at 21 in FIG. 2, so as to expose the edges 14d of the flanges.

In this form of the invention a sleeve 25 is slidably mounted on the arbors which are herein illustrated as being cylindrical. The sleeve is normally positioned, as shown in FIGS. 1 and 2, so as to surround the ends of the two arbors 10, 16 in their cooperating position. While the sleeve may be sealed in many ways, in the herein illustrated form of the invention each arbor 10, 16 has a groove 10a, 16a holding an O-ring 26 which cooperates with the sleeve to form a sealed connection. The sleeve carries a conduit 27 which may be connected to a usual source of vacuum and opens onto the chamfered section of the arbors which form an annular chamber. When it is desired to evacuate the article, a vacuum is applied through the conduit to the annular chamber and the free edges of the flanges are disposed between the cutaway portions 21 and the article evacuated thereby. After the evacuation is completed, the arbors are firmly pressed together against the flanges so as to seal the container. The sleeve 25 is moved along the arbors to the position shown in FIG. 3 so as to expose the free edges of the flanges. The free edges of the flanges are then secured together by welding, brazing, soldering or by other suitable means to form a hermetically sealed article, by either rotating the arbors past a fixed welding unit 28 or by moving the welding unit around the fixed arbors.

Should it be desired to fill the article with a material after the evacuation takes place, as shown in FIG. 2, the conduit 27 is connected to a source of said material (not shown) and the material M is forced into the cavity 20 and into the article 14 as shown in FIG. 4. Thereafter, the arbors are moved together so as to press the flanges together in sealing relation. The sleeve 25 is then withdrawn as shown in FIG. 5, exposing the free edges of the flanges and they are then sealed by a welding unit 28 in the manner indicated in FIG. 5.

In the form of the invention shown in FIGS. 6 to 8, the arbor 10 is slidably mounted in aperture 30 in the bottom of a tank 31 containing the material M to be filled in the article. The tank carries a sealing ring 32 for sealing engagement with the arbor. The article 14 is placed in the recess 11 in the end of the arbor so that it rests on the flange-engaging portions 12. The end of the arbor 10 and the article are submerged in the tank of material as shown in FIG. 6. Thereafter, the other arbor then moves to the position of FIG. 7 wherein the article is enclosed in the cavity 20 and the flanges 14c are pressed into sealing relation. It will be noted that the arbor 16 is provided with a vent 33, if necessary, to vent the cavity during the closing thereof. After the flanges 14c are pressed together by the second arbor 16, the arbors 10 and 16 are moved simultaneously upwardly, as shown in FIG. 8, to expose the free edges 14d of the flanges which are then welded by the welding unit 28, or otherwise secured together, as shown in FIG. 8.

Variations and modifications may be made within the scope of the claims and portions of the improvements may be used without others.

I claim:
1. Means for preparing plural-part sealed articles, each part having projecting cooperating flanges comprising a first arbor having an article-receiving recess in the end thereof with the ends of the walls of the arbor surrounding the recess having a flange-engaging surface, said recess receiving said article to be sealed with the flanges supported on said sealing surface and with the edge of the flange exposed, and a second arbor having an end wall provided with a flange-engaging surface, the second arbor being movable into cooperative relation with the first arbor with the flange-engaging surface on the end walls engaging the flanges to press said flanges together to seal the same, said arbors being cut back to expose the edges of the flanges, a sleeve surrounding the ends of the arbors in flange-engaging position, said sleeve being in sealing engagement with said arbors and carrying means for treating said article and being thereafter moved relative to said arbors to expose the edge of the flanges to enable said edges to be secured together, and means securing together the exposed edges of the flanges.

2. The invention as defined in claim 1 wherein said arbors have O-rings mounted thereon adjacent said ends to provide the means for sealing said sleeve in operative position.

3. The invention as defined in claim 1 wherein the means on the sleeve for treating the article includes a conduit connected to the sleeve to communicate with said flanges and adapted to evacuate or fill said article.

4. The method of preparing a sealed two-part hollow article, each part having projecting flanges, the steps of seating said article in a recess in the end of a first arbor with the flange portions in contact and resting on a flange-engaging end of the arbor surrounding the recess with the free edge of the flange portion exposed, disposing the end of the first arbor and the article positioned thereon within a tank having material to be entrapped in said article prior to moving a second arbor into cooperative relation with said first arbor and enclosing the article with the end of said second arbor engaging said flange portion with the free edge portion exposed, pressing said flange-engaging end portion of said arbors together to seal the flanges on the hollow article, simultaneously moving both arbors in the same direction to remove the ends of the arbors out of the tank, and securing the exposed edges of the flanges together.

5. Means for preparing plural-part sealed articles, each part having projecting cooperating flanges comprising a first arbor having an article-receiving recess in the end thereof with the ends of the walls of the arbor surrounding the recess having a flange-engaging surface, said recess receiving said article to be sealed with the flanges supported on said sealing surface and with the edge of the flange exposed, and a second arbor having an end wall provided with a flange-engaging surface, the second arbor being movable into cooperative relation with the first arbor with the flange-engaging surfaces on the end walls engaging the flanges to press said flanges together to seal the same, said arbors being cut back to expose the edges of the flanges, a tank of material to be enclosed in the article surounding the end of the first arbor and the article carried thereby and said second arbor being moved into engagement with the flange while the article is in the tank, and said two arbors being moved simultaneously to remove the article from the tank and expose the edges of the flanges to be secured together, and means securing together the exposed edges of the flanges.

6. The method of preparing a sealed two-part hollow article, each part having projecting flanges, the steps of seating said article in a recess in the end of a first arbor with the flange portions in contact and resting on the flange-engaging end of the arbor surrounding the recess with the free edge of the flange portion exposed, moving a second arbor having a recess in its end surface into cooperative relation with said first arbor and enclosing the article with the end of said second arbor surrounding said recess engaging said flange portion with the free edge of said flange portion exposed, treating the enclosed article to evacuate or fill the same with fluid, pressing said flange-engaging end portions of the arbors together to seal the flange of the hollow article, surrounding the ends of both arbors and the enclosed article with a sealing sleeve prior to treating the enclosed article, removing the sealing sleeve to expose the edges of the flange portions after the ends of the arbors are pressed together to enable said edges to be sealed together, and securing the exposed edges of the flanges together.

References Cited
UNITED STATES PATENTS 2,326,296    8/1943    Harrison et al. _____ 53—83 X
3,020,686    2/1962    Rueckert et al. _____ 53—22

TRAVIS S. McGEHEE, Primary Examiner

U.S. Cl. X.R.

29—454; 53—83, 86, 112